United States Patent
Bury et al.

(10) Patent No.: US 7,477,732 B2
(45) Date of Patent: Jan. 13, 2009

(54) METHOD AND SYSTEM FOR MULTIPLE-CHANNEL AUTOMATIC RECALL

(75) Inventors: Emmanuel Bury, Pont l'Eveque (FR); Alan Kerdraon, Caen (FR); Jacques-Olivier Rebillon, Caen (FR); Eric Flammant, Caen (FR)

(73) Assignee: France Telecom, Paris (FR)

( * ) Notice: Subject to any disclaimer, the term of this patent is extended or adjusted under 35 U.S.C. 154(b) by 659 days.

(21) Appl. No.: 10/499,205

(22) PCT Filed: Dec. 13, 2002

(86) PCT No.: PCT/FR02/04338

§ 371 (c)(1),
(2), (4) Date: Nov. 19, 2004

(87) PCT Pub. No.: WO03/055186

PCT Pub. Date: Jul. 3, 2003

(65) Prior Publication Data

US 2005/0063527 A1    Mar. 24, 2005

(30) Foreign Application Priority Data

Dec. 21, 2001    (FR) .................................... 01 16752

(51) Int. Cl.
*H04M 3/436*    (2006.01)
*H04M 3/48*    (2006.01)

(52) U.S. Cl. ............. 379/210.01; 379/196; 379/201.02; 455/414.1

(58) Field of Classification Search ................ 379/201, 379/201.01, 188, 196–197, 201.02, 210.01; 370/259; 455/414, 414.1
See application file for complete search history.

(56) References Cited

U.S. PATENT DOCUMENTS

| | | | |
|---|---|---|---|
| 4,932,050 A | | 6/1990 | Davidson et al. |
| 5,742,905 A | * | 4/1998 | Pepe et al. .................. 455/461 |
| 5,764,747 A | | 6/1998 | Yue et al. |
| 6,104,799 A | * | 8/2000 | Jain et al. .............. 379/211.01 |
| 6,411,805 B1 | * | 6/2002 | Becker et al. ............ 455/414.1 |
| 2003/0076941 A1 | * | 4/2003 | Tiliks et al. ................. 379/196 |

FOREIGN PATENT DOCUMENTS

WO    WO 98 56194 A    12/1998

* cited by examiner

*Primary Examiner*—Harry S Hong
(74) *Attorney, Agent, or Firm*—Miles & Stockbridge P.C.; Eric G. King

(57) ABSTRACT

The invention concerns a method which consists in introducing for each registered user a profile comprising filtering and agenda data, determining and updating an accessibility status of each registered user terminal (10, 11), depending on whether the latter is accessible or not through a network, and following a call by a caller to the registered user: determining an availability status of the called user depending on whether the caller is authorized to communicate with the called party on the basis of the called party's profile data, and an identification of the caller, if the called party is not accessible or does not authorize the caller to complete his call, proposing to the caller to be automatically put through to the called party, when the latter will be accessible and available for the caller, if the latter agrees, triggering an automatic recall procedure enabling to put through the caller's call (17) to the called party.

13 Claims, 2 Drawing Sheets

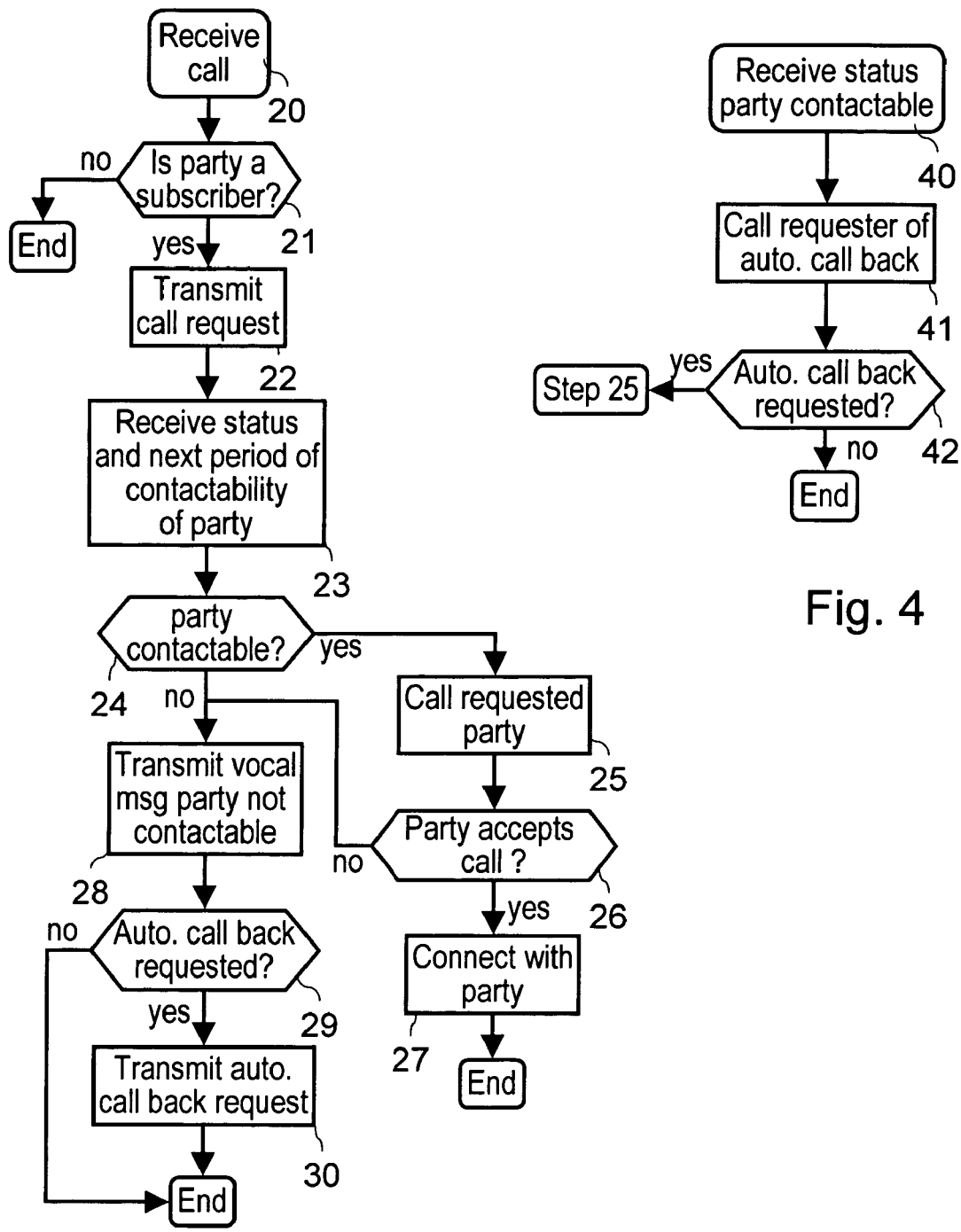

METHOD AND SYSTEM FOR MULTIPLE-CHANNEL AUTOMATIC RECALL

FIELD OF THE INVENTION

This invention relates to telephone services and in particular a service to automatically call back a party.

Description of Related Art currently, some switched networks offer an automatic call back service, offering to the caller to automatically call back his party if the latter is already having a telephone conversation. If the caller gives his approval by pressing a predefined button on his telephone, the automatic call back service calls the caller back as soon as his party has hung up the handset, then is connected with the latter.

Such a service has the inconvenience to function only on switched networks that can be accessed with a fixed telephone, and is offered only if the requested party is already on the line.

This service also does not provide for offering users the possibility to specify call-filtering rules, associating time slots with lists of authorized or unauthorized parties.

Furthermore, if the called party has several communications terminals (personal fixed telephone and at the office, mobile phone), the caller is led to attempt to call each of these terminals one after the other, until the called party answers. When each of these terminals is connected to a voice messaging service or can be accessed through a telephone switchboard, communication is established at each call attempt, even if the called party is not in a position to answer. As soon as the called terminal answers, a call is billed to the caller. This results in many calls being billed by the telecommunications operators, although they have not made it possible to establish communication with the called party.

Summary of the Invention

The purpose of this invention is to suppress these inconveniences. This objective is reached by providing for a process that automatically calls back called users, requested by a calling user in a telecommunications system including at least a telecommunications network or digital data transmission network, with each user being equipped with at least a telecommunications terminal that can be connected to one of the networks. According to the invention, this process is characterized in that it comprises the steps consisting of introducing a user profile for each registered user, including agenda and filtering data defining time slots of availability, each one associated at least one list of parties authorized or not to call the user during the time slot, to determine and to keep up to date an accessibility status for each registered user terminal, according to which the registered user is accessible or not by a network through the terminal, and following a call by a calling user for a registered user:

determining an availability status of the called user according to which the calling user is authorized at the current moment to have communication with the called user according to the profile data of the called user, and to identification information of the calling user, if the called user is not accessible or does not authorize the calling user to have communication with him, to offer to the calling user to be automatically connected to the called user, as soon as the latter will be accessible and available for the calling user, and if the latter accepts, to trigger an automatic call back procedure and, during an automatic call back procedure triggered as soon as the called user becomes accessible and available for the calling user, to call back the latter and connect him with the called user.

More favorably, the automatic call back procedure asks the calling user if he still wishes to be placed in contact with the called user, and asks the called user if he accepts to be connected to the calling user, and establishes the call between the calling user and the called user if the latter two have accepted to be placed in contact.

According to a particularity of the invention, the profile of a registered user includes the respective telephone numbers of several terminals through which the user may be called, and when a user dials a contact number that has beforehand been assigned to a registered user, he is placed in contact with a call server that will or will not establish communication with one of the terminals of the registered user, in function of the accessibility status of these terminals and the availability status of the registered user.

More preferably, if several terminals of the same registered user are accessible at a given instant, the calling user is connected with the registered user following a step of selecting an accessible terminal of the registered user according to an order of priority, and calling the selected terminal.

According to another particularity of the invention, when a registered user changes from the status in which he is located near a terminal identified in his profile, and/or in which the terminal can receive calls from a network, to a status in which he no longer is located near a terminal identified in his profile, or in which the terminal is no longer in a position to receive calls from a network, and inversely, a procedure for declaring the accessibility of the terminal is triggered to update the status of terminal accessibility.

According to another particularity of the invention, each user profile includes at least one directory of which each entry associates a party's identifier with a party's telephone number.

This invention also relates to a system for automatically calling back a registered user, requested by a calling user in a telecommunications system including at least one telecommunications network or digital data transmission network, each user being equipped with at least one telecommunications terminal that can be connected to one of the networks. According to the network, this system includes:

a service coordination server with which the users of the automatic call back service must register and introduce a user profile including agenda and filtering data defining time slots of availability each one associated with at least one list of parties authorized or not to call the user during the time slot, means for updating an accessibility status for each registered user, according to which at least one terminal of the user is or is not accessible by a network and is or is not on the line, a call server to which are transmitted all of the calls destined to a registered user, means for updating an availability status of a registered user in relation to a calling user, according to which the latter is authorized or not to have contact with the registered user, means for triggering an automatic call back procedure of a registered user, called by a calling user, when the called user is not accessible or available in relation to the calling user, this automatic call back procedure placing the calling user is in contact with the called user, as soon as the latter becomes accessible and available for the calling user, according to the statuses of accessibility and availability.

More favorably, each terminal of a registered user is associated with means for emitting an accessibility message to the means for updating the accessibility status of each user, each time the user passes from a status in which he is in a position to receive calls by the terminal, to a status in which he is no longer in a position to receive calls by the terminal, and inversely.

In the case where the terminal of the registered user is a fixed telephone, this system includes more preferably means for detecting the presence or absence of the user near the fixed telephone, and means for transmitting to the means for updating the accessibility status of the user, a message of accessibility of the fixed telephone each time there is change in the presence status of a user near the fixed telephone.

In the case where the terminal of the user is a mobile telephone, this system includes more preferably a program which is loaded into the memory of the mobile telephone and which is executed when the mobile telephone is turned on if the latter is located in a zone covered by the corresponding mobile telephone network, or when the mobile telephone is turned off, in order to trigger the emission to the means for updating the accessibility status of the user, of a message of accessibility of the mobile telephone in order to declare the latter respectively accessible or not accessible.

In the case where the terminal of the user is a terminal equipped with data processing means and connected to a land network, this system includes more preferably a program which is loaded into the memory of the terminal and which is executed when the terminal is turned on, or when the terminal is turned off, to trigger the emission to the means for updating the accessibility status of the user, of a message of accessibility of the terminal to declare the latter respectively accessible, or not accessible.

BRIEF DESCRIPTION OF THE DRAWINGS

A preferred embodiment of the invention shall be disclosed hereafter, by way of a non-limitative example, with reference to the annexed drawings in which

FIGS. 3 and 4 show in the form of flow charts the different steps in an aujomatic call back process according to the invention.

DESCRIPTION OF THE PREFERRED EMBODIMENT(S)

Figure 1:
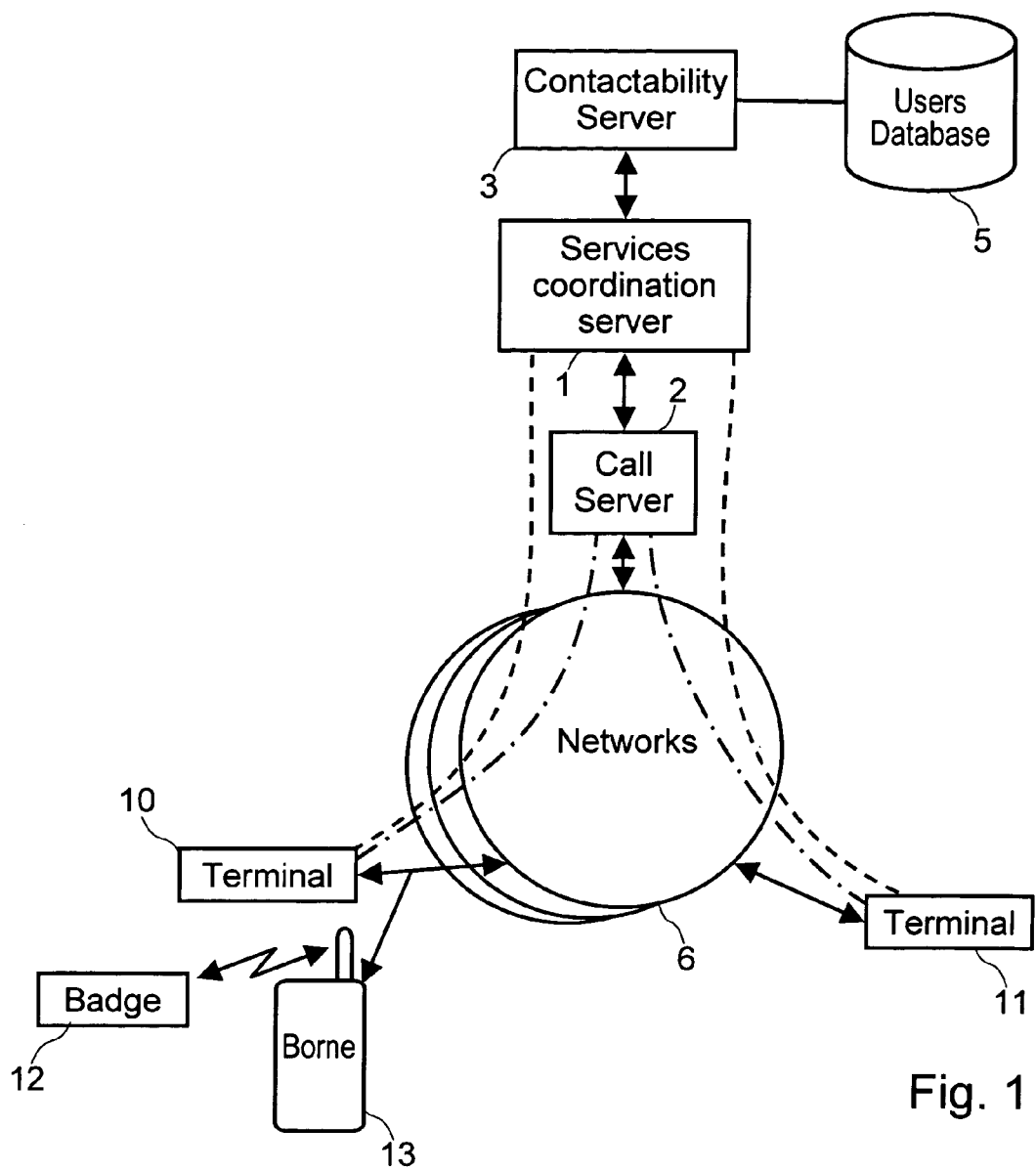
FIG. 1 shows in the form of a block diagram an automatic call back system according to the invention.

The system shown in FIG. 1 includes a call server 2 allowing communication to be established between several parties each equipped with at least one terminal 10, 11, via one or several telecommunications networks 6, a contactability server 3 which has access to all of the information determining the contactability of a registered user, and a service coordination centre 1 which ensures in particular coherency between the processing performed by the contactability server 3 and the call server 2.

Servers 1, 2, 3 are interconnected by a data transmission network which can be of the public or private type, for example the Internet network.

Call server 2 is more favorably designed to diffuse vocal messages to one or several parties. It can be comprised of a service control point (SCP) or of a service node in a smart network, of an SIP proxy server or of a "Gatekeeper VoIP.".

Contactability server 3 has access to a database 5 of user profiles containing for each registered user of the call back service, directories of names and telephone numbers of parties of the user.

In order to determine the contactability status of the user, each user profile in database 5 also contains an agenda grouping together the appointments of the user. Each appointment includes in particular:

an appointment date beginning and ending time of the appointment, and an availability status (free or contactable, busy, absent, etc.) of the user during the appointment.

This appointment information may also include the purpose and place of the appointment, the place of the appointment making it possible to determine through which terminal 10, 11 the user can be called if he has declared several in his profile. The agenda of a user stored in database 5 may also contain filtering information in which the time slots are associated with lists of parties defined by an identifier or telephone number, each list of parties being associated with an availability status (contactable or not contactable). In this way, a user can define that within a certain time slot, he does not want to be in contact with a party that is part of the list of parties associated with a non contactable status, or he wants to be placed in contact only with a party that is on a list of parties associated with a contactable status.

The profile of a user in database 5 can also include one or several directories of the user's parties, each directory containing one entry per party associating an identifier and a telephone number.

The directories and agendas of each user can also be implemented in the form of distinct services managed by distinct entities. In this case, database 5 can be distributed over several distinct external servers.

In order to be able to benefit from the automatic call back service, each user must register and if necessary subscribe to the service with service coordination server 1 and define a profile in which he provides all the information necessary to the automatic call back service, this information including in particular directory and agenda information, which is stored in database 5, as well as the telephone numbers or addresses of all terminals 10, 11 through which the user can be contacted, each terminal specified in this way may be associated to an order of preference. Of course, through appropriate means (for example a computer connected to the Internet network), registered users can have access to update the profile information pertaining to them, contained in database 5, for example through a site that can be accessed via the Internet network and for which access requires the key entry of an identifier and a password. Users of the call back service also have the possibility to introduce into their profile specific rules, for example that they cannot be contacted during an appointment outside of their office.

At the registration of a user, the service coordination server 1 assigns an identification or contact number to the user allowing him to be identified by the server and with which he can also be called by his parties. This contact number can be a number defined according to the E164 standard, the telephone number of the fixed or mobile telephone of the user, an IP (Internet Protocol) address, or an e-mail address, or any other type of address that can characterize the connection point of a terminal to a network.

Terminal 10, 11 likely to be used to be called by the automatic call back service can be a mobile telephone or any other terminal having access to a cellular telephony network, a terminal equipped with data processing means and connected to a land network such as an IP terminal connected to a public data transmission network (for example a computer connected to the Internet network), and also a fixed telephone connected to a public switched telephone network. An IP terminal can be used with an IP telephony or instantaneous electronic messaging application. When it connects or is turned on, the IP or mobile terminal executes an accessibility declaration procedure, installed beforehand in the terminal, either in the SIM card, or a memory module that can be plugged into the terminal. This procedure consists of emitting a message destined for the service coordination server 1 containing the telephone number or IP address of the terminal. This procedure can also consist of calling server 1 which at the time of connection memorizes the telephone number of the terminal.

In the case of a mobile terminal, the transmission of such message is carried out in the form of a data message, for example of the SMS (Short Message Service) or USSD (Unstructured Supplemental Service Data) type in the case of a GSM network, an MMS (Multimedia Messaging Service) message in the case of a network of the UMTS type, or a message transmitted by a data channel according to the GPRS (General Packet Radio Service) standard, or a WAP (wireless Application Protocol) message.

Inversely, when the user turns off or disconnects his terminal, the latter executes beforehand an analogous accessibility declaration procedure, during the course of which the terminal is declared as not accessible to server 1. Such a disconnection procedure can also be triggered automatically in the case of a mobile terminal, when the power level of the batteries of the terminal reach a predetermined low threshold. It can also be provided to execute the accessibility declaration procedure at each passage from a non-covered zone into a zone covered by the network corresponding to the mobile terminal.

In the case where terminal 10, 11 is a fixed telephone, the user of the service must declare himself as accessible, i.e. declare that he is in a position to answer if the fixed telephone rings. Such declaration can be carried out manually by calling the service coordination server 1, by dialing a telephone number of server 1 provided for this purpose, or by using a button on the handset, programmed for this purpose. This declaration can also be carried out automatically through the intermediary of base 13 connected to the network by the same line as the fixed telephone, and having transmission means by short range radio (a few meters to a few dozen meters) for example in accordance with the "Bluetooth" standard. Such a base can also be incorporated into the fixed telephone. As for the user, he must wear corresponding transmission means, designed to receive a message emitted periodically by the base and to transmit to the base as a response an acknowledgement message of receipt, as long as these transmission means are located within the radio range of the base.

More favorably, the acknowledgement message of receipt emitted by the wearable transmission means contains the telephone or contact number of the user. In this way, a user can be called on a fixed phone that belongs to another user.

This wearable transmission means is for example in the form of a badge or contactless chip card. It can also be incorporated into the mobile terminal of the user.

The first time such an acknowledgement message of receipt is received, base 13 calls server 1 to declare the presence of the users near his fixed telephone. Inversely, when the base no longer receives acknowledgement messages of receipt from badge 12, base 13 calls server 1 again to declare the departure of the user.

When a terminal is in this way detected as accessible, i.e. it allows entering into contact with the user, service coordination server 1 creates an access session corresponding to the terminal of the user, and a service session.

If several terminals for the same user are declared as accessible, an order of priority can be applied, for example defined in the user's profile, or by default if the profile does not specify any order of priority.

Figure 2:
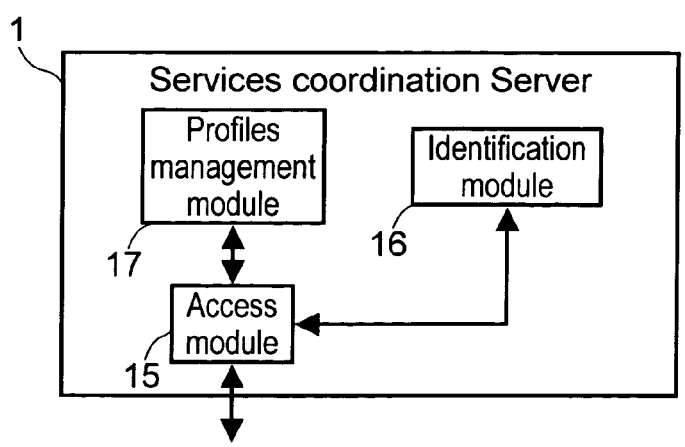
FIG. 2 shows in detail in the form of a block diagram a service coordination system used in the system shown in figure 1.

In FIG. 2, the service coordination server 1 includes an access module 15, an identification and authentication module 16, a subscriber profile management module 17. Module 15 constitutes an access point to service coordination server 1 and receives service requests coming from the users, by the intermediary of call server 2. When a user connects, a service request emitted to the service coordination server contains information concerning the identity of the user including at least an identifier, and possibly a password, and information concerning the requested service. In the present case, this information contains for example the user's telephone number. The identification and authentication module 16 is connected to the access module and has for function to identify and authenticate a user using identification information and possibly a password or SIM card number (in the case of mobile telephones). This module verifies the existence of the user and authenticates him for example using the password or SIM card number. Module 16 communicates to access module 15 the result of identification and authentication.

Profile management module 17 handles user profiles stored in one or more profile databases and in particular database 5. Using the identifier of a user provided by access module 15, profile manager 17 queries the database to obtain the user profile that corresponds to the identifier provided. The profile manager creates, for each user, a unique context to which is attached:

- one or several access sessions, characterizing the physical connection of the user (PC, mobile: or fixed telephone, etc.) or the activation of the call back service by the user, and
- one or several service sessions, attached to an access session and characterizing the unfolding of the processing of a service.

When a user equipped with terminal 11 attempts to contact a registered user equipped with terminal 10, he must call server 2 and provide the contact number of the user to call. Access to call server 2 can for example be carried out by dialing a prefix number followed by the contact number of the party to call or be carried out automatically at the level of the switching equipment that following the detection of the contact number redirects the call to the call server.

In a favorable embodiment of the invention, a registered user can be called by any telephone number or address of one of the user's terminals, stored in the profile of the latter, with all of the calls to these numbers and addresses automatically redirected to call server 2.

Call server 2 that receives a call executes procedure 20 shown in FIG. 3. At step 21, the call server determines if the contact number to be called received corresponds to a user registered in service coordination server 1. For this purpose, it emits a query to server 1 which provides it with the response. If the requested party is a registered user, call server 2 transmits 22 a query to service coordination server 1, containing the contact number to be called and the telephone number of the calling user.

Note that the calling user is not necessarily registered with or subscribing to service coordination server 1.

Server 1 that receives such request determine if there exists an access session corresponding to the requested user (accessible user) and if the accessible terminal of the user is free or on the line, according to the active service and access sessions for the requested user. Then it emits a query to the contactability server 3 to obtain availability information for the requested user for the calling user.

When such request is received, contactability server 3 accesses the agenda and filtering information from the user profile in database 5, in order to determine if the requested user can be contacted by the calling user at the present time. If the requested user is not contactable for the calling user, it determines the next time slot during which the calling user is authorized to call the requested user. This availability information is then provided to server 1. Service coordination server 1 determines using this availability information and the accessibility status of the requested user (at least one terminal of the requested user accessible or not), if the requested user is contactable (if at least one terminal of the user is accessible and not busy, and if the calling user is authorized to communicate with the called user), and sends this information to call server 2.

Call server receives 23 and analyses this information. If the requested party is contactable (step 24), the call server calls 25 the requested party to ask him if he accepts to receive a call from the calling user (identified by his telephone number or by his name if it is mentioned in association with his telephone number in the directory of the user's profile stored in database 5).

If the requested party accepts the call, for example by pressing a certain button on his terminal 10, 11 (step 26), call server 2 connects the requested user with the calling user (step 27).

If the party refuses the call in step 26, or is not contactable in step 24, the call server diffuses 28 to the calling user a message, for example vocal, indicating that the requested party is not contactable or is busy, and offers him an automatic call back service. Furthermore, if the requested party is not available for the calling user at the present time, call server 2 proposes to the calling user to indicate to him the next available time slot of the party such as was provided by the contactability server 3 via server 1. Call server 2 can also propose to the calling user to give him access to vocal messaging of the requested party. If the calling user requests to deposit a message in the voice mailbox of his party, he is connected by the call server with the voice mailbox of the requested party in order to leave a message.

If the calling user requests the next available time slot during which he can contact his party, call server 2 diffuses this information, for example in vocal format, and asks him if he desires that the party to be called be called back automatically as soon as the latter becomes available (for example by pressing a particular button on his terminal 11).

If the calling user accepts 29 the automatic call back, call server 2 informs 30 service coordination server 1 of this service request and terminates communication with terminal 10, 11 of the calling user. Following this notification, server 1 creates an automatic call back service and access session for the user to be called and informs contactability server 3 of this. Contactability server 3 then increments an automatic call back counter associated with the user to be called, the value of this counter corresponding to the number of parties attempting to contact the user to be called.

The automatic call back service session thus created groups together the following information:

the telephone number of the calling user (E164 number, IP address, email address, etc.) and the accessibility status of the terminal (not accessible/accessible and free/accessible and busy) of the called user, the availability status of the called user according to the identity of the calling user.

This latter piece of information is updated by the contactability server at each change in the user's contactability status, determined according to the current time and the agenda and the filtering information specified in the user's profile.

Furthermore, before creating a new automatic call back session, service coordination server 1 verifies that a session does not already exist for the calling user, and if such is the case, it does not create a new session. It can also delete the automatic call back sessions that were activated during a period that exceeds a predefined maximum period.

Note that in step 25, it may occur that the requested user is registering an accessible status, but cannot be called. Such a case is detected at the expiration of a delay triggered at the emission of a message requesting authorization to establish communication, in step 25. This case occurs for example when the terminal involved is a mobile terminal which has left the zone covered by the corresponding mobile network. Server 1 then updates the accessibility status of the requested user to "non accessible" status and if no other terminal of the user has accessible status, call server 2 executes steps 28 to 30 disclosed hereinabove.

When the automatic call back session of the calling user passes to the accessible and available status (for the calling user), service coordination server 1 informs call server 2 of a connection establishment request, and call server 2 executes procedure 40 shown in FIG. 4.

In this procedure, call server 2 connects 41 with the user that requested the automatic call back service, and requests 42, for example in vocal format, if he still desires to be placed in contact with the requested party. IF the user's response is affirmative, provided for example by pressing a particular button on the terminal, the call server executes procedure 20 starting at step 25, in order to possibly place the calling user in contact with the requested party, if the latter accepts.

Service coordination server 1 then deletes the corresponding automatic call back session and informs the contactability server 3 which decrements the automatic call back counter corresponding to the called user.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. An automatic call back process for automatically calling back registered users called by a calling user in a telecommunications system including at least one telecommunications network or digital data transmission network, and at least one telecommunications terminal for each user adapted to be connected to one of the networks, said process comprising the steps of:

introducing a user profile for each registered user in a database, said profile including agenda and filtering data defining time slots of availability, each said time slot being associated with at least one list of parties being authorized or not authorized to call the user during each said time slot, determining and updating an accessibility status for each registered user which specifies at least one terminal associated with the registered user to be accessible or not accessible by a network through the terminal, following a call by a calling user to a called registered user, and determining an availability status of the called registered user according to which the calling user is authorized within the current time slot to have communication with the called registered user, according to the profile data of the called registered user, and according to identification information of the calling user, wherein if the called registered user is not accessible or does not authorize the calling user to have communication with the called registered user during said current time slot, offering to the calling user to be automatically connected to the called registered user as soon as the called registered user is accessible and available for the calling user within the next available time slot of the called registered user according to the agenda data of said called registered user, and, if the called registered user accepts the offer, triggering an automatic call back procedure, and during the automatic call back procedure triggered within said next available time slot of the called registered user and as soon as the called registered user becomes accessible and available for the calling user, calling back the calling user and connecting the calling user with the called registered user.

2. The process as set forth in claim 1, further comprising:

asking the calling user if he still desires to be placed in contact with the called registered user, asking said called registered user if he accepts to be connected to the calling user, and establishing the call between the calling user and the called registered user upon mutual acceptance of the users to be placed in contact.

3. The process as set forth in claim 1, wherein the profile of a registered user includes the respective telephone numbers of a plurality of said terminals through which the registered user may be called, and wherein when a calling user dials a contact number that has beforehand been assigned to a registered user, the calling user is placed in contact with a call server that will or will not establish communication with one of the terminals of the registered user, in accordance with of the accessibility status of the terminals and the availability status of the registered user.

4. The process as set forth in claim 3, wherein if several terminals of the same registered user are accessible at a given instant, the calling user is connected with the registered user following a-steps of selecting an accessible terminal of the registered user according to an order of priority, and calling the selected terminal.

5. The process set forth in claim 1, further comprising:

declaring the accessibility of the terminal to update the status of terminal accessibility when a registered user changes from a status in which the registered user is located near a terminal identified in the registered user's profile, and/or in which the terminal can receive calls from a network, to a status in which the registered user no longer is located near a terminal identified in the registered user's profile, or in which the terminal is no longer in a position to receive calls from a network, 6. The process set forth in claim 1, wherein each registered user profile includes at least one directory of which each entry associates a party's identifier with a party's telephone number.

7. An automatic call back system for automatically calling back registered user called by a calling user in a telecommunications system that includes at least one of a telecommunications network and a digital data transmission network, and at least one telecommunications terminal for each user adapted to be connected to one of the networks, the system comprising:

a service coordination server with which each user of the automatic call back system must register and introduce a user profile including agenda and filtering data defining time slots of availability, each said time slot being associated with at least one list of parties being authorized or not authorized to call the user during said time slot, means for updating an accessibility status of each registered user, according to which at least one terminal of said registered user is or is not accessible by a network and is or is not on the line, a call server to which is transmitted all of the calls destined to a registered user, means for updating an availability status of a registered user in relation to a calling user, according to which the calling user is authorized or not authorized to have contact with the registered user, according to said filtering and agenda data contained in the profile of the registered user, and means for triggering an automatic call back procedure of a registered user called by a calling user, when a called registered user is not accessible or available in relation to the calling user, said automatic call back procedure placing the calling user in contact with the call registered user during the next available time slot of said called registered user according to the agenda data of said called registered user and as soon as the called registered user becomes accessible and available for the calling user, according to the of said accessibility status and said availability status.

8. The system as set forth in claim 7, wherein each terminal of a registered user is associated with means for emitting an accessibility message to the means for updating the accessibility status of each registered user each time the registered user's status changes from a status in which the registered user is in a position to receive calls by the terminal to a status in which the registered user is no longer in a position to receive calls by the terminal, and, conversely, each time the registered user's status changes from a status in which the registered user is not in a position to receive calls by the terminal to a status in which the registered user is in a position to receive calls by the terminal.

9. The system as set forth in claim 7, where wherein if the terminal of a registered user is a fixed telephone, said system further includes;

means for detecting the presence or absence of the registered user near the fixed telephone, and means for transmitting to the means for updating the accessibility status of the registered user, a message of accessibility of the fixed telephone, each time there is change in the presence status of said user near the fixed telephone.

10. The system as set forth in claim 7, wherein if the terminal of registered user is a mobile telephone, said terminal triggers to the means for updating the accessibility status of said registered user a message of accessibility of the mobile telephone in order to declare the mobile telephone respectively accessible or not accessible, when the mobile telephone is turned on, if the mobile telephone is located in a zone covered by a corresponding mobile telephone network, or when the mobile telephone is turned off 11. The system as set forth in claim 7, wherein if the terminal of the user is a terminal equipped with data processing means and connected to a land network, the terminal triggers to the means for updating the accessibility status of said registered user a message of accessibility of the terminal to declare the registered user accessible or not accessible, terminal is turned off 12. A service coordination server for the implementation of an automatic call back service of a registered user, requested by a calling user in a telecommunications system including at least one telecommunications or digital data transmission network, each user being equipped with at least one telecommunications terminal adapted to be connected to one of the networks, the server comprising:

means for allowing users of the automatic call back service to register and introduce a user profile including the agenda and filtering data defining time slots of availability, each said time slot being associated with at least one list of parties being authorized or not authorized to call the user during said time slot, means for updating an accessibility status of each registered user, according to which at least one terminal said each registered user is or is not accessible by a network and is or is not on the line, means for updating an availability status of a registered user in relation to a calling user, according to which the calling user is authorized or not authorized to have contact with the registered user according to the filtering and agenda data contained in the profile of the registered user, and means for triggering an automatic call back procedure of the registered user called by a calling user, when a called registered user is not accessible or not available in relation to the calling user, said automatic call back procedure connecting the calling user with the called registered user during the next available time slot of the called registered user according to the agenda data of said called registered user and as soon as the called registered user becomes accessible and available for the calling user, according to of said accessibility status and said availability status.

13. A computer-readable medium upon which is embodied a sequence of programmable instructions implementing the process of claim 1, and which, when executed by a server connected to at least one telecommunications or digital data transmission network, for the implementation of an automatic call back service of a called registered user called by a calling user, each user being equipped with at least one telecommunications terminal adapted to be connected to one of the networks, causes the server to perform the process of claim 1.

* * * * *

UNITED STATES PATENT AND TRADEMARK OFFICE
CERTIFICATE OF CORRECTION

PATENT NO. : 7,477,732 B2  
APPLICATION NO. : 10/499205  
DATED : January 13, 2009  
INVENTOR(S) : Emmanuel Bury et al.

Page 1 of 1

It is certified that error appears in the above-identified patent and that said Letters Patent is hereby corrected as shown below:

Column 9 – Line 51 – Delete "a-".

Column 10 – Line 35 – Delete "the of".

Column 11 – Line 7 – Insert --when the-- before "terminal".

Column 11 – Line 22 – Insert --of-- after "terminal".

Column 12 – Line 14 – Delete "of".

Signed and Sealed this

Seventh Day of April, 2009

JOHN DOLL  
*Acting Director of the United States Patent and Trademark Office*